(12) United States Patent
Schmid

(10) Patent No.: US 6,334,228 B1
(45) Date of Patent: Jan. 1, 2002

(54) APPARATUS, SYSTEM AND METHOD FOR QUANTIFYING CARBON DIOXIDE DISPERSAL ON VENTILATED SLEEP SURFACES

(75) Inventor: William R. Schmid, Plymouth, MN (US)

(73) Assignee: Halo Innovations, Inc., Plymouth, MN (US)

( * ) Notice: Subject to any disclaimer, the term of this patent is extended or adjusted under 35 U.S.C. 154(b) by 0 days.

(21) Appl. No.: 09/411,783

(22) Filed: Oct. 1, 1999

(51) Int. Cl.[7] ............................................... A47C 21/00
(52) U.S. Cl. ................................ 5/726; 5/658; 5/423
(58) Field of Search ............................. 5/423, 726, 724, 5/658; 62/261; 73/861.52, 204.21

(56) References Cited

U.S. PATENT DOCUMENTS

| 5,675,852 A | 10/1997 | Watkins | 5/726 |
| 5,693,079 A | 12/1997 | Van Duren | 5/423 |
| 5,787,534 A | 8/1998 | Hargest et al. | 5/423 |
| 5,887,303 A | 3/1999 | Raith | 5/726 |
| 5,887,304 A | 3/1999 | von der Heyde | 5/726 |
| 6,052,853 A | 4/2000 | Schmid | 5/726 |

Primary Examiner—Alexander Grosz
(74) Attorney, Agent, or Firm—Merchant & Gould PC

(57) ABSTRACT

A method for quantifying airflow, in the form of a measured airflow rate, through a porous surface. The method is particularly useful for ventilated sleep surfaces used to prevent SIDS. Provided that one knows the correlation between air flow rate and $CO_2$ washout times, the resulting measured airflow rate provides an indication of whether a ventilated sleep surface is providing sufficient airflow to effectively dissipate the $CO_2$. One can determine the minimum measured airflow rate that is effective to provide a minimum adequate level of $CO_2$ dispersal. Thus, a ventilated sleep surface system that produces an air flow sufficient to result in the minimum airflow rate, as measured by a suitable airflow meter, can effectively dissipate $CO_2$ and reduce the risk of SIDS.

15 Claims, 3 Drawing Sheets

APPARATUS, SYSTEM AND METHOD FOR QUANTIFYING CARBON DIOXIDE DISPERSAL ON VENTILATED SLEEP SURFACES

BACKGROUND OF THE INVENTION

Carbon Dioxide ($CO_2$) that is retained and rebreathed in the bedding of prone sleeping infants is believed to be a contributing factor to an elevated risk of Sudden Infant Death Syndrome (SIDS) in these infants. In light of the fact that infants tend to roll to a prone position, and since some infants need to sleep in a prone position for medical reasons, dispersal of this $CO_2$ to ambient levels when the infant is in the prone position is important in order to reduce the risk of SIDS.

Research has shown that a passive approach to dispersing $CO_2$ is generally ineffective when challenged by the various positions an infant can sleep in. Therefore, active airflow has been used to dissipate the $CO_2$. One approach to providing such active airflow is the use of a ventilated sleep surface in which air is directed upwardly through a mattress assembly upon which the infant sleeps. Examples of ventilated sleep surfaces include U.S. Pat. Nos. 5,887,304 and 5,675,852.

However, there are effective and practical limits to the airflow that are of critical importance to the health of the infant. If there is insufficient airflow, the $CO_2$ dispersal rate is too low and $CO_2$ retention continues to increase. On the other hand, if the airflow is too great, the baby risks being chilled without heating the airflow.

In order to deliver air where it is needed most (i.e. the microenvironment in closest proximity to the infant's nostrils or mouth), a ventilated sleep surface system must have enough static pressure to overcome the obstructive nature of the microenvironment. Consequently, a simple measurement of airflow will not ensure adequate dispersal rates without the static pressure to back it up.

What is needed is an apparatus, system, and method for quantifying $CO_2$ dispersal on a ventilated sleep surface by which a measured air flow rate produced by the ventilated sleep surface corresponds to a resulting amount of $CO_2$ dispersal.

SUMMARY OF THE INVENTION

In one aspect, the invention provides a method for quantifying airflow, in the form of a measured airflow rate, through a porous surface. The method is particularly useful for ventilated sleep surfaces used to prevent SIDS. Provided that one knows the correlation between air flow rate and $CO_2$ washout times, the resulting measured airflow rate provides an indication of whether a ventilated sleep surface is providing sufficient airflow to effectively dissipate the $CO_2$.

In another aspect, the invention provides a ventilated sleep surface system that has air flow that is sufficient to produce a minimum flow rate measured by a flow meter. Based upon the correlation between airflow rates and washout times, one can determine a minimum airflow rate that results in sufficient $CO_2$ dispersal. Thus, by operating the ventilated sleep surface system with an air flow that produces the measured minimum flow rate, a person knows that adequate $CO_2$ dispersal is being achieved, thereby reducing the risk of SIDS.

In yet another aspect, the invention provides a flow meter allowing an accurate measurement of the airflow rate produced by a porous surface, such as used on a ventilated sleep surface.

In one embodiment in accordance with the invention, a method of measuring airflow through a porous surface includes accumulating a portion of the air that flows through the porous surface; concentrating the accumulated portion of air; and measuring the airflow rate of the concentrated portion of air.

In yet another embodiment of the invention, a ventilated sleep surface system includes a porous cover, with the porous cover including a plurality of holes therein, and a fan for producing air flow through the plurality of holes. The flow of air through the holes is sufficient to produce a flow rate, as measured by a meter having an accumulator and a concentrator, that is effective to dissipate $CO_2$.

In still another embodiment of the invention, an airflow meter comprises an accumulator including an open bottom, a plurality of side walls and a top wall. The plurality of side walls and the top wall define a hollow interior. An elongated concentrator is connected to the top wall and projects upwardly therefrom. The concentrator includes a flow passage extending longitudinally therethrough, with the flow passage being in flow communication with the hollow interior. Further, an access nipple is connected to the concentrator, with the access nipple including a central passage in flow communication with the flow passage.

These and various other advantages and features of novelty which characterize the invention are pointed out with particularity in the claims annexed hereto and forming a part hereof. However, for a better understanding of the invention, its advantages and objects obtained by its use, reference should be made to the drawings which form a further part hereof, and to the accompanying description, in which there is described a preferred embodiment of the invention.

DETAILED DESCRIPTION OF THE PREFERRED EMBODIMENT

Infant sleep positions create various microenvironments, each of which has its own resistance to airflow. For instance, the infant sleep position that creates the greatest airflow resistance, and thus the greatest challenge to $CO_2$ dispersal, is a prone position with face nearly straight down and with arm positioned next to face. On the other hand, a face up sleep position provides little airflow resistance and $CO_2$ dispersal is typically not a great concern. At the sleep position that creates the greatest airflow resistance, there will be a corresponding minimum airflow rate that must be achieved in order to have adequate $CO_2$ dispersal. Therefore, it would be desirable to be able to measure the air flow rate being produced by a ventilated sleep surface to ensure that the ventilated sleep surface is producing an air flow that is able to effectively dissipate $CO_2$, particularly at the prone sleeping position of an infant.

Figure 1:
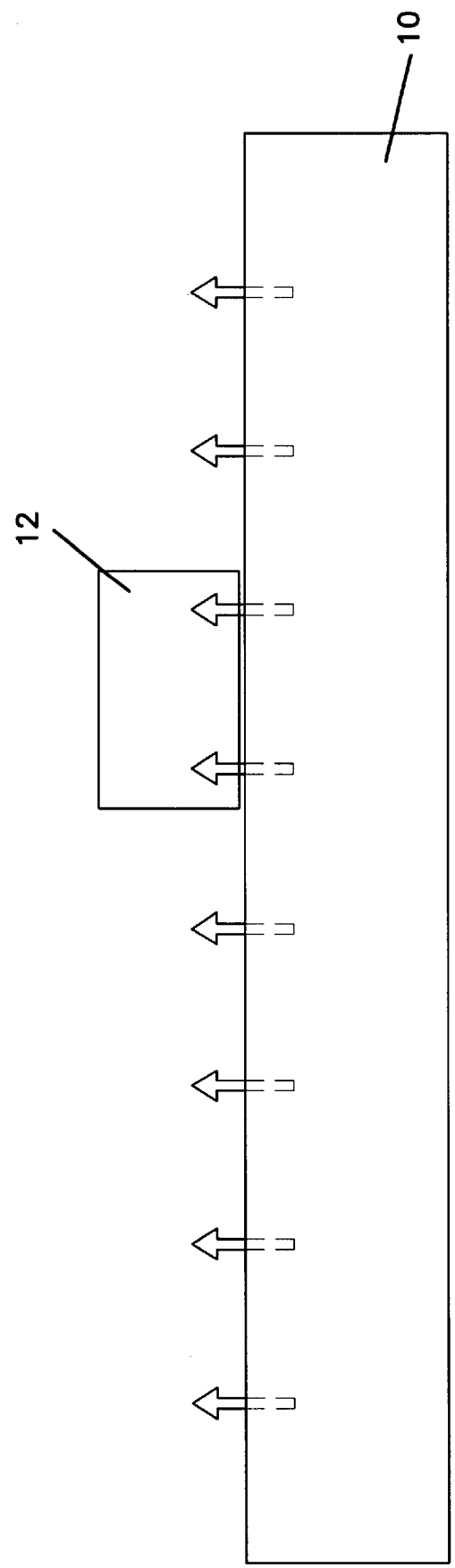
FIG. 1 is a side view of a ventilated sleep surface with an airflow meter in accordance with the invention positioned thereon for measuring the airflow rate.

FIG. 1 illustrates the principles of the invention, where a ventilated sleep surface 10 is designed to discharge air upwardly therefrom through numerous holes provided therein. An airflow meter 12 is placed on top of the ventilated sleep surface 10 for measuring the airflow rate of the air exiting through the top of the ventilated sleep surface 10. The airflow meter 12 is designed to accumulate the airflows from a plurality of holes, and then concentrate the airflows to increase the flow rate thereof and permit a flow rate measurement.

To measure whether the ventilated sleep surface 10 is providing sufficient airflow to effectively dissipate $CO_2$ at the prone sleeping position, the airflow meter 12 is designed with its own built-in airflow resistance to simulate the resistances that are presented by the various microenvironments found in infant sleep positions. Each air flow rate that is measured by the meter 12 generally correlates to a distinct $CO_2$ washout level. Therefore, if one initially knows the correlation between $CO_2$ washout levels and air flow rates, one need only measure the air flow rate in order to provide an indication of whether adequate $CO_2$ dispersal will result therefrom.

Figure 2:
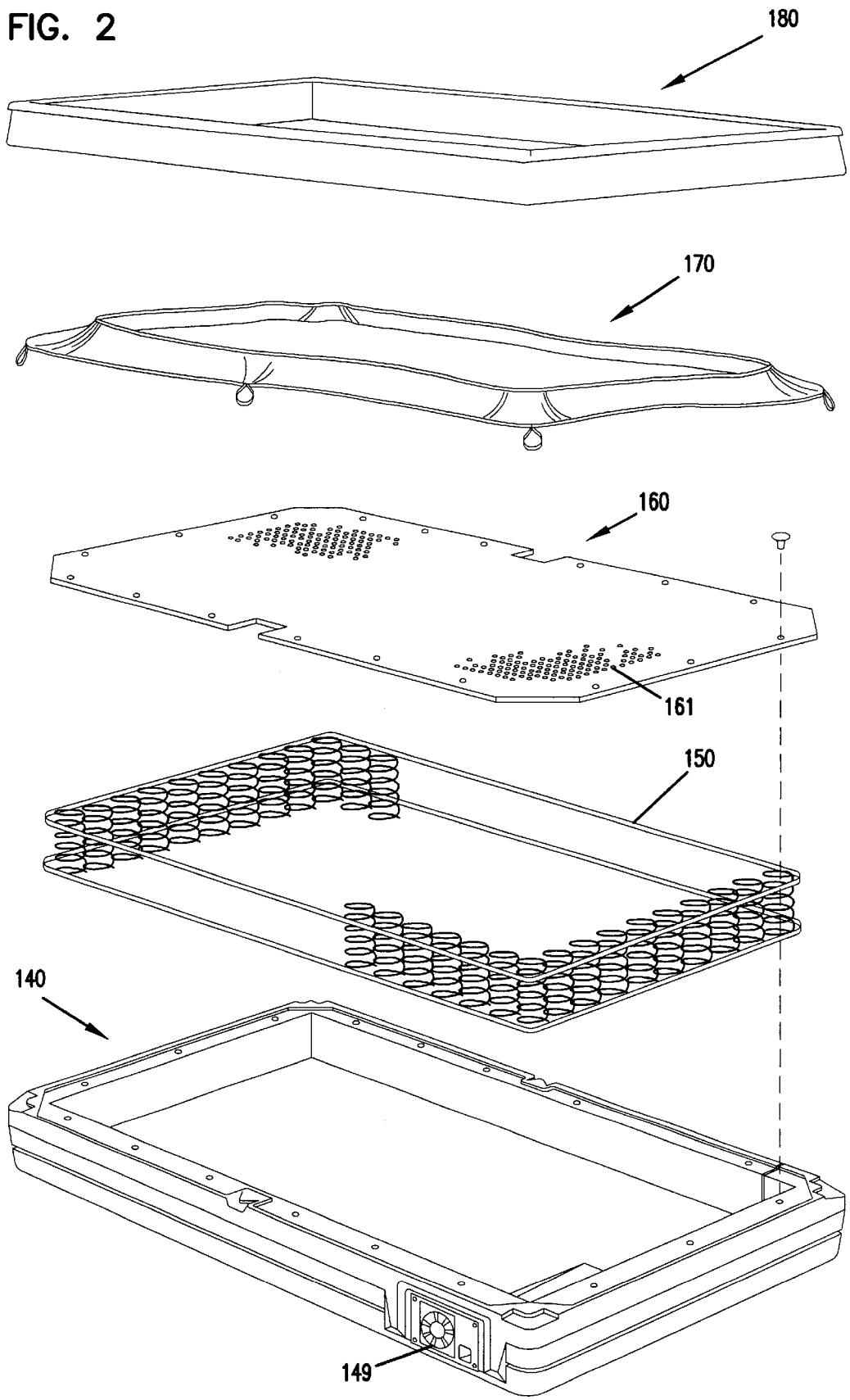
FIG. 2 is an exploded perspective view of a prior art ventilated sleep surface.

An example of the ventilated sleep surface 10 is illustrated in FIG. 2. The ventilated sleep surface 10 includes a mattress foundation 140 with a fan 149 positioned therein for producing an air flow through the ventilated sleep surface. A mattress inner core 150 fits within the foundation 140, and a ventilated top cover 160 is positioned on top of the core 150. The cover 160 is provided with a plurality of generally evenly distributed holes 161 for allowing the free flow of air therethrough. FIG. 2 further illustrates bedding 170 that may be placed above the top cover 160, as well as an optional bumper assembly 180 that can rest on the foundation 140. Further details of the construction and operation of the ventilated sleep surface 10 can be found in co-pending U.S. patent application Ser. No. 08/782,249, now U.S. Pat. No. 6,052,853, which is herein incorporated by reference in its entirety. It is to be realized that other ventilated sleep surface arrangements could be used within the scope of the invention, and that the invention is not limited to the ventilated sleep surface specifically illustrated in FIG. 2.

Rather than measuring the airflow rate at a single hole 161 on the ventilated sleep surface 10, the meter 12 is designed to accumulate and concentrate the airflows from numerous holes 161. The reason for this is that the flow rate of air exiting any one of the holes typically varies from the flow rates of the air exiting from adjacent holes due to obstructions within the sleep surface 10, such as the core 150, that can affect airflow to each individual hole. Thus, measuring airflow rate at a single hole will generally result in an inaccurate measurement. However, by accumulating airflow from numerous holes, the different flow rates are essentially "averaged", and the resultant measured airflow rate provides a more accurate measure of the overall airflow rate provided by the ventilated sleep surface.

Figure 3:
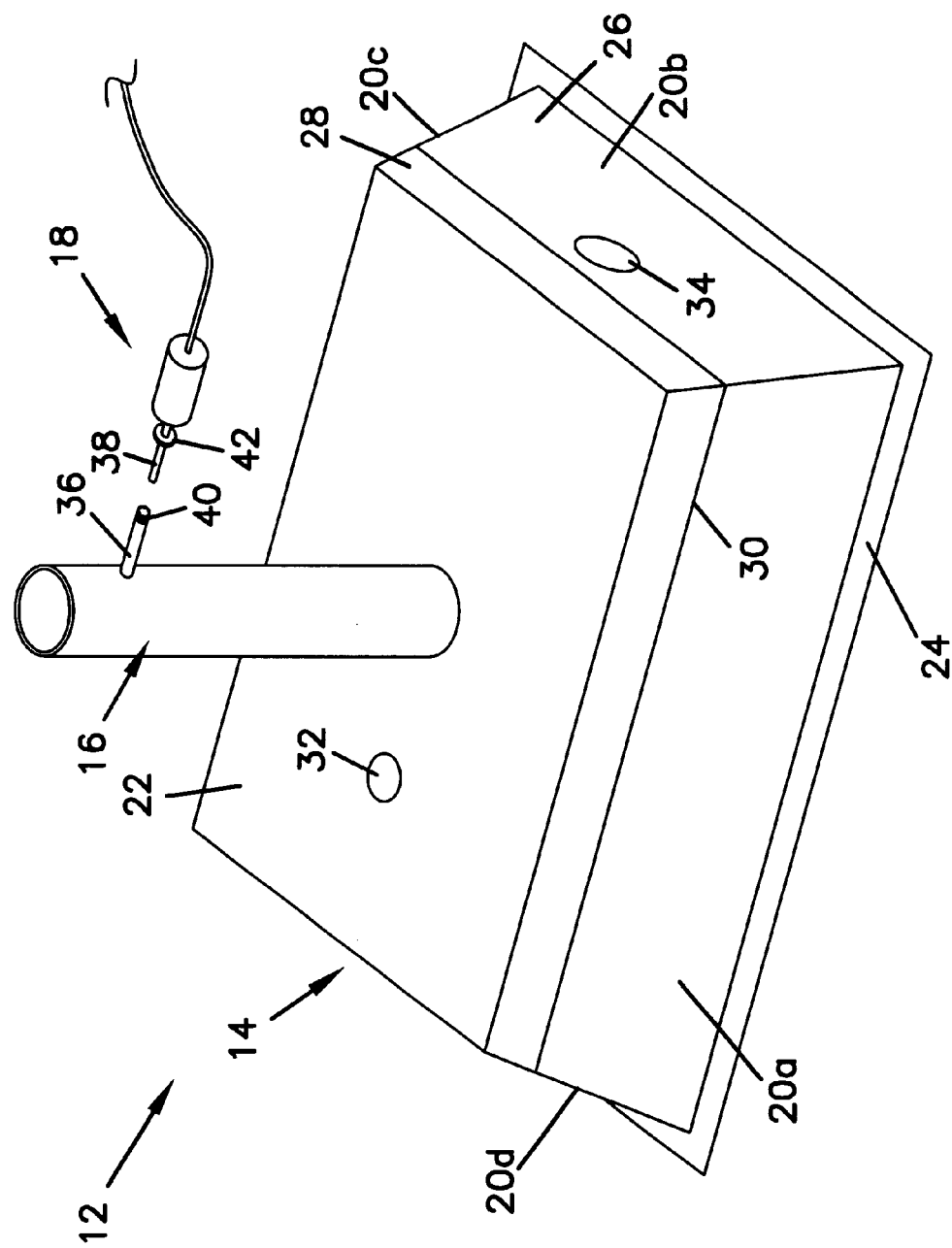
FIG. 3 is a perspective view of an airflow meter in accordance with the invention along with an exemplary airflow sensor.

One implementation of the airflow meter 12 is illustrated in FIG. 3. The airflow meter 12 includes generally an accumulator or hood 14 and a concentrator 16 projecting from the accumulator 14. An air flow rate sensor 18 cooperates with the concentrator 16 to measure the airflow rate through the concentrator 16.

The accumulator 14 is generally rectangular in shape with an open bottom, and four side walls 20a, 20b, 20c, 20d and a top wall 22 defining a generally hollow interior. The side walls 20a–d taper generally continuously from the base edges thereof to the top wall 22, so that the volume of the hollow interior decreases continuously from the open bottom to the top wall. A horizontal flange 24 extends continuously around the base edges of the accumulator 14 to provide a good seal with the surface of the ventilated sleep surface 10.

The accumulator 14 is preferably constructed of a plastic material to render the meter 12 lightweight and easily transportable. However, the accumulator 14 could be constructed of materials other than, or in addition to, plastic, such as aluminum or fiberglass.

As shown, the accumulator 14 is formed of a lower portion 26 and an upper portion 28 that detachably fits onto the lower portion 26 via a friction fit, with the lower portion 26 and upper portion 28 defining a junction 30 therebetween. Thus, the upper portion 28 can be removed from the lower portion 26 by simply lifting the upper portion 28 upward, thereby allowing access to the interior of the accumulator without substantially disturbing the position of the lower portion 26. It is also contemplated that the lower portion 26 and upper portion 28 could be formed as an integral, single piece, in which case the entire accumulator 14 would need to be lifted to gain access to hollow interior thereof.

The accumulator 14 is also preferably provided with one or more access holes 32 extending through the top wall 22 and/or side walls 20a–d. The access holes 32 provide access to the interior space of the accumulator 14 for sensors to measure $CO_2$ wash-out times. However, the access holes 32 are normally closed by suitable means, such as removable plugs 34 or the like, when access to the interior space of the accumulator is not required.

The concentrator 16 is preferably an elongated cylindrical pipe that extends through a hole in the top wall 22 of the accumulator 14, with the pipe being fixed within the hole and projecting upwardly from the top wall 22. The pipe 16, like the accumulator, is preferably made of a plastic material, such as polyvinylchloride (PVC), although the pipe could be made from other materials, such as metal or fiberglass. Further, while the pipe is illustrated as having a cylindrical passage, other passage shapes, such as triangular or rectangular, could be used as well. The cross-sectional area of the pipe 16 is substantially less than the area of the open bottom of the accumulator so as to provide a pressure drop across the accumulator and pipe.

The concentrator pipe 16 is open at each of its ends so that air flow collected by the accumulator 14 flows upwardly through the concentrator pipe 16 to permit air flow rate measurements. An access nipple 36 extends through the concentrator 16, generally perpendicular to the longitudinal axis thereof, to permit insertion of the sensor 18 into the concentrator 16 for air flow rate readings by the sensor 18. The access nipple 36 includes a central passage therein through which a probe 38 on the sensor 18 extends into the interior of the concentrator 16 and into the flow path. The exterior of the nipple 36 is preferably provided with threads 40 which engage with a nut 42 on the probe 38 to enable securement of the sensor 18 to the concentrator 16.

The sensor 18 is preferably a hot wire anemometer, although other devices that are used to measure air flow rates can be used as well, such as a pitot tube anemometer or the like. The sensor 18 is preferably connected to a suitable output device of a type known in the art for displaying the air flow rate occurring within the concentrator 16.

It has been found that an accumulator 14 covering an area of approximately 451.64 $cm^2$ (70 $in^2$) at the base thereof, and a concentrator 16 that is about 24.13 cm (9.5 inches) long and about 3.81 cm (1.5 inches) in diameter, combine to provide an adequate simulation of the above-mentioned airflow resistance. Generally, it is preferred that the ratio of the area covered by the accumulator versus the cross-sectional area of the concentrator be in the range of about 20:1 to about 60:1, and most preferably the ratio is about 40:1.

The covering area of the accumulator 14 cannot be made too large, as the pressure created by the ventilated sleep surface can be seriously affected thereby resulting in potentially inaccurate airflow rate measurements by the meter 12. Preferably the covering area of the accumulator is less than half, and more preferably less than a quarter of, the area of the ventilated sleep surface. For a ventilated sleep surface having an area of about 7432.7 cm$^2$ (1152 in$^2$) and having its air discharge holes generally evenly distributed thereon, the accumulator 14 described in the preceding paragraph, which has an area of about 451.64 cm$^2$ (70 in$^2$), covers approximately 6% of the air discharge holes, which has been found to provide suitably accurate airflow rate measurements without significantly affecting the airflow through the remainder of the ventilated sleep surface.

For the accumulator 14 covering an area of approximately 451.64 cm$^2$ (70 in$^2$) at the base thereof, and a concentrator 16 that is about 24.13 cm (9.5 inches) long and about 3.81 cm (1.5 inches) in diameter, the inventors have discovered that air flow rates between about 10.20 cm/s (20 ft/min) to about 55.88 cm/s (110 ft/min), preferably between about 25.40 cm/s (50 ft/min) to about 50.80 cm/s (100 ft/min), more preferably between about 25.40 cm/s (50 ft/min) to about 30.48 cm/s (60 ft/min), and most preferably about 25.40 cm/s (50 ft/min), are desired in order to achieve effective $CO_2$ dispersal. These air flow rates have been determined using the meter 12 with bedding in place on the ventilated sleep surface, to more closely resemble actual sleeping conditions. It is to be realized that measurements could be made with the bedding taken off the ventilated sleep surface as well.

Airflow through the concentrator 16 at a rate corresponding to about 10.20 cm/s (20 ft/min) has been determined to generally form the very low end of effectiveness and correlates to $CO_2$ washout levels determined to have no impact on arterial blood gas, but still above the levels associated with ambient or face-up infant sleep conditions. At airflow rates between about 15.24 cm/s (30 ft/mim) to about 20.32 cm/s (40 ft/min), washout improves, but still falls short of ambient conditions. At an airflow rate of about 25.40 cm/s (50 ft/min), washout levels approximate ambient conditions. Airflow rates up to about 50.80 cm/s (100 ft/min) can be tolerated by most infants with normal sleepwear and a blanket. However, beyond about 50.80 cm/s (100 ft/min) the risk of overcooling the infant increases.

The preferred flow rates are dependent upon a variety of factors, including the arrangement of the bedding and the type of sleepware worn by the infant. If the bedding is ruffled and bunched around the infants head, a higher minimum flow rate may be necessary in order to dissipate $CO_2$. On the other hand, the minimum flow rate may be able to be reduced when the bedding is generally taught. Further, the maximum flow rate may be extended in those instances when the infant is sufficiently dressed in extra warm sleepwear. Conversely, if the infant is dressed in light-weight sleepwear, a reduction in the maximum flow rate could be necessary.

The measurement of the air flow rate using the flow meter of the invention can be performed at the time the ventilated sleep surface is manufactured as well during the useful lifetime thereof. Thus, as applied to a ventilated sleep surface system, the inventive method and flow meter have applications for both manufacturers and consumers.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method of measuring airflow through a porous sleep surface of a ventilated sleep surface system, the method comprising:
    covering a portion of the porous sleep surface with an air accumulator that accumulates a portion of the air that flows through the porous sleep surface;
    concentrating the accumulated portion of air through a concentrator; and
    measuring the airflow rate of the concentrated portion of air.

2. The method according to claim 1, wherein the accumulator has a covering area, and the concentrator has a cross-sectional area, wherein the ratio of the covering area to the cross-sectional area is in the range of about 20:1 to about 60:1.

3. The method according to claim 2, wherein the ratio is about 40:1.

4. The method according to claim 1, wherein measuring the airflow rate comprises measuring the airflow rate with bedding disposed on the porous sleep surface.

5. The method according to claim 1, wherein the porous sleep surface includes a plurality of holes therein.

6. The method according to claim 1, wherein the measured airflow rate is between about 10.20 cm/s to about 55.88 cm/s.

7. The method according to claim 6, wherein the measured airflow rate is between about 25.40 cm/s to about 50.80 cm/s.

8. The method according to claim 7, wherein the measured airflow rate is between about 25.40 cm/s to about 30.48 cm/s.

9. The method according to claim 8, wherein the measured airflow rate is about 25.40 cm/s.

10. A ventilated sleep surface system including a porous cover, said porous cover including a plurality of holes therein; and a fan for producing air flow through said plurality of holes; wherein the flow of air through the holes is sufficient to produce a flow rate of at least about 10.20 cm/s as measured by a meter having an accumulator with a covering area and a concentrator having a cross-sectional area and a ratio of the covering area to tire cross-sectional area being about 20:1 to about 60;1, whereby the air flow is (effective to dissipate $CO_2$.

11. The ventilated sleep surface system according to claim 10, wherein the ratio is about 40:1.

12. The ventilated sleep surface system according to claim 10, wherein the flow of air through the holes is sufficient to produce a flow late of between about 10.20 cm/s to about 55.88 cm/s as measured by the meter.

13. The ventilated sleep surface system according to claim 12, wherein the flow of air through the holes is sufficient to produce a flow rate of between about 25.40 cm/s to about 50.80 cm/s as measured by the meter.

14. The ventilated sleep surface system according to claim 13, wherein the flow of air through the holes is sufficient to produce a flow rate of between about 25.40 cm/s to about 30.48 cm/s as measured by the meter.

15. The ventilated sleep surface system according to claim 14, wherein the flow of air through the holes is sufficient to produce a flow rate of about 25.40 cm/s as measured by the meter.

* * * * *